No. 701,631. Patented June 3, 1902.
G. H. SHERMAN.
VEHICLE RUNNING GEAR.
(Application filed Mar. 31, 1902.)
(No Model.)

WITNESSES.
O. B. Baenziger
C. E. Davis

INVENTOR.
George H. Sherman.
By R. C. Wheeler &c.
Attorneys

THE NORRIS PETERS CO., PHOTO-LITHO., WASHINGTON, D. C.

UNITED STATES PATENT OFFICE.

GEORGE H. SHERMAN, OF DETROIT, MICHIGAN.

VEHICLE RUNNING-GEAR.

SPECIFICATION forming part of Letters Patent No. 701,631, dated June 3, 1902.

Application filed March 31, 1902. Serial No. 100,690. (No model.)

*To all whom it may concern:*

Be it known that I, GEORGE H. SHERMAN, a citizen of the United States, residing at Detroit, in the county of Wayne, State of Michigan, have invented certain new and useful Improvements in Vehicle Running-Gears; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to vehicle running-gears especially designed for automobile use; and it consists in the construction and arrangement of parts hereinafter fully set forth, and pointed out particularly in the claims.

The object of the invention is to provide simple and efficient means whereby the springs which support the body of the vehicle may be relieved from the draft of the driving-chain without impairing their resiliency, and a further arrangement whereby an adjustment may be effected in a simple manner to take up the slack that may occur in the driving-chain.

The above object is attained by the structure illustrated in the accompanying drawings, in which—

Figure 1:
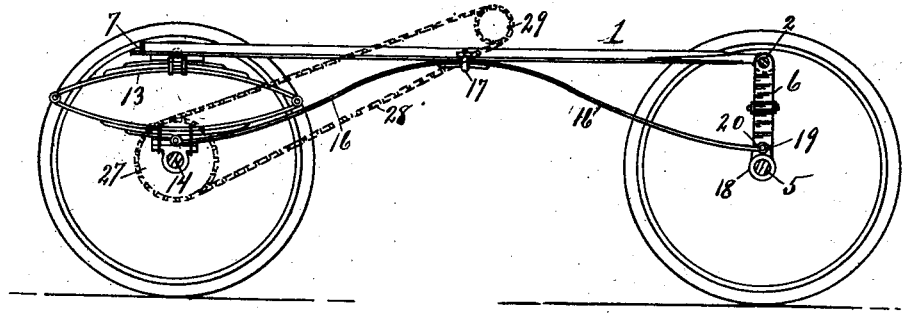
Figure 2:
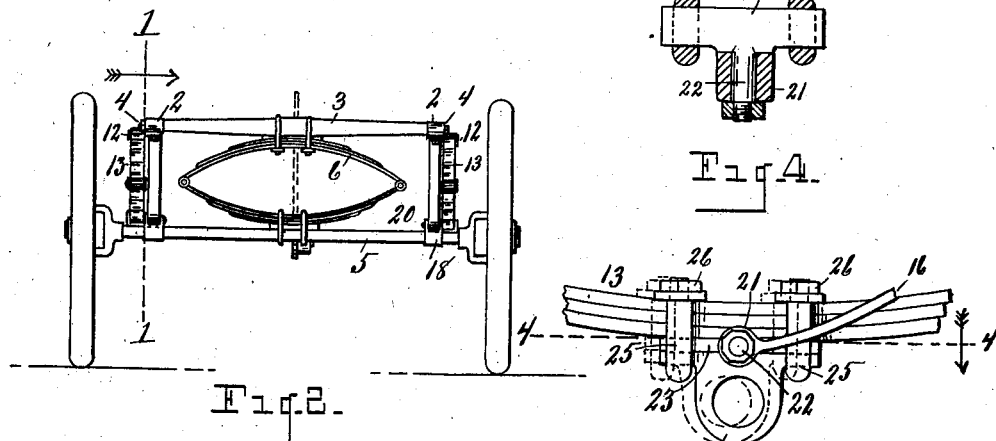
Figure 4:
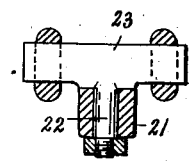
Figure 5:
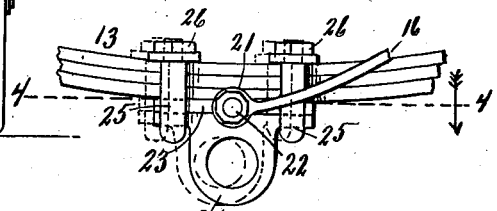
Figure 3:
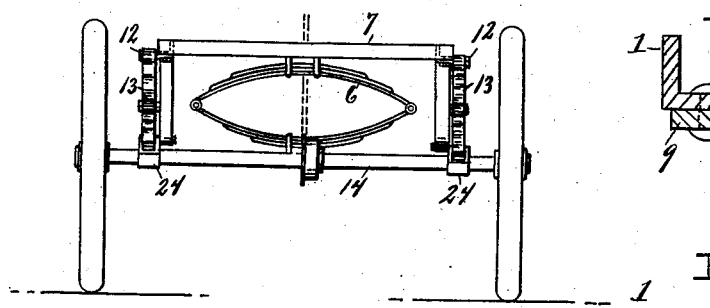
Figure 7:
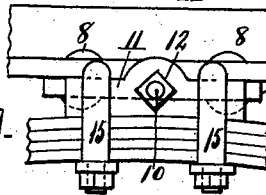

Figure 1 is a longitudinal sectional view through the running-gear of a vehicle embodying my invention, as on line 1 1 of Fig. 2. Fig. 2 is a front elevation of the running-gear. Fig. 3 is a rear elevation thereof. Fig. 4 is a horizontal section through the clips or couplings that secure the springs to the rear axle, as on line 4 4, Fig. 5. Fig. 5 is an enlarged detail in side elevation, showing the manner of attaching the springs to the rear axle and of adjusting the parts to swing the axle rearwardly for the purpose of tightening the chain. Fig. 6 is an enlarged detail in transverse section, showing the connection between the upper side of the rear springs of the side bars of the frame. Fig. 7 is a side elevation of Fig. 6.

In the building of automobiles it has been found desirable to employ the elliptical style of spring upon which to mount the vehicle-body, and as a rule these springs serve as the only connection between the body of the vehicle and the axles. As the motor is mounted upon the body of the vehicle and the driving sprocket-wheel upon the rear axle, it will be seen that the strain of the draft exerted by the driving-chain must be borne by the springs—an arrangement which is objectionable because of the unusual strain which the springs are called upon to bear in addition to that of supporting the load. The arrangement herein shown overcomes these objections without impairing the resiliency of the springs.

Referring to the characters of reference, 1 designates the side bars of the frame, adapted to support the vehicle-body. These side bars extend longitudinally of the frame and are provided with eyes 2 at their forward ends, which receive the opposite ends of the forward cross-bar 3, which are secured therein by the nuts 4. Interposed between the cross-bar 3 and the front axle 5 is the elliptical spring 6, which is secured to said parts in any suitable manner.

The rear ends of the side bars of the frame are connected by a cross-bar 7, as shown in Fig. 3. The side bars 1 are preferably formed of angle-iron, and secured thereto by bolts or rivets 8 (see Figs. 6 and 7) are brackets 9, carrying the projecting journal-pins 10, which pass through the bearing-blocks 11 and receive upon their outer ends the nuts 12. These bearing-blocks are mounted upon the elliptical springs 13, which support the rear end of the frame, and are in turn supported upon the rear axle 14. The bearing-blocks 11 are secured to the springs 13 by the embracing clips 15, as shown in Figs. 6 and 7, which clamp said parts firmly together. This construction just described provides for a rigid union between the rear axle and the rear springs and a pivotal union between the upper side of said springs and the frame of the vehicle through the medium of the journal-pin 10.

To provide for bracing the axles of the vehicle, side springs 16 are employed, which extend longitudinally of the frame and which curve upwardly at the center and are secured by clips 17 to the side bars 1. The ends of said springs 16 extend downwardly and are secured to the front and rear axles, respectively, of the vehicle. The front ends of said springs 16 are secured to the front axle by means of the collars 18, which embrace the axle and are provided with opposed ears between which the eyes 19 of said springs lie and are secured by the bolts 20. The rear ends of said springs 16 are also provided with eyes 21, (see Figs. 4 and 5,) which embrace the journal-pins 22, projecting from the plates 23, which are adapted to rest upon the bearing-collars 24, that embrace the rear axle and that are secured to the rear springs by the clips 25, the plates 23 being interposed between the said bearing-collars and the lower leaf of the springs 13. By means of the nuts 26 upon the clips 25 said parts may be bound tightly together.

The driving sprocket-wheel 27 is mounted upon the rear axle and is driven through the medium of a chain 28, leading from the sprocket-wheel 29 on the shaft of the motor, (not shown,) but adapted to be mounted upon the body of the vehicle.

It will be seen that the springs 16, extending from the frame to the axles, serve as a truss to brace the axles and relieve in a measure the strain upon the main springs. It will also be seen that the rear ends of said springs extend from the frame to the rear axle nearly parallel with the chain 28 and serve to brace the rear axle against the draft of said chain, thereby relieving the springs which support the vehicle-body from the strain exerted by the motor in driving the vehicle, while the resiliency of the supporting-springs is not impaired, owing to the hinged or pivoted union between said springs and the frame, which allows the springs 16 to elongate as the supporting-springs are compressed, the axles moving slightly farther apart as the supporting-springs are rocked by the elongation of the springs 16.

While the springs 16 serve to brace the rear axle against the draft of the motor-chain, they also serve as a spring-reach to tie the axles together.

In order to provide for taking up the slack in the driving-chain 28, the structure shown in Fig. 5 is employed, whereby when it is desired to increase the distance between the rear axle and the motor-shaft for the purpose of tightening the chain the nuts 26 upon the clips 25 may be loosened and the rear axle moved rearwardly, as shown by dotted lines in Fig. 5, the plates 23, to which the rear ends of the springs 16 are attached, sliding through the clips 25 in this operation and the rear springs turning upon the pivot-pin 10 in the bearing-blocks 11 to accommodate said movement. When adjusted to place the proper tension upon the driving-chain, the parts are again secured by tightening the nuts 26.

Having thus fully set forth my invention, what I claim as new, and desire to secure by Letters Patent, is—

1. In a vehicle running-gear, the combination of a frame, the axles, springs interposed between the axles and frame and pivoted to the latter, and side springs joined at their center to the frame and coupled at their ends to the axles.

2. In a vehicle running-gear, the combination of a frame, the axles, springs interposed between the axles and frame, side springs attached at their center to the frame and at their ends to the axle, the coupling which unites one end of said springs to the axle being adjustable.

3. In a vehicle running-gear, the combination of a frame adapted to support a motor, the axles, springs interposed between the axles and frame and pivoted to the latter, side springs extending between the axles and attached to the frame, a sprocket-wheel on the rear axle, a chain extending from said wheel to the motor-shaft, and means for adjusting the rear axle to take up the slack of the sprocket-chain.

In testimony whereof I sign this specification in the presence of two witnesses.

GEORGE H. SHERMAN.

Witnesses:
E. S. WHEELER,
C. E. DAVIS.